(12) United States Patent
Adelsberg et al.

(10) Patent No.: US 7,828,480 B2
(45) Date of Patent: Nov. 9, 2010

(54) THERMOCOUPLE CIRCUIT AND METHOD AND SYSTEM FOR FORMING SAME

(75) Inventors: Lee Martin Adelsberg, Elmira, NY (US); John Michael Drosdak, Big Flats, NY (US); Paul Richard Grzesik, Corning, NY (US); Trudy A Knutson, Frankfort, KY (US); David Myron Lineman, Painted Post, NY (US); Kevin Barry Reiman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 360 days.

(21) Appl. No.: 12/004,263

(22) Filed: Dec. 20, 2007

(65) Prior Publication Data

US 2008/0175304 A1    Jul. 24, 2008

(51) Int. Cl.
*G01K 7/02* (2006.01)
(52) U.S. Cl. .................................. 374/179; 374/7.035
(58) Field of Classification Search .................. 374/179
See application file for complete search history.

(56) References Cited

U.S. PATENT DOCUMENTS

| | | | |
|---|---|---|---|
| 6,951,419 B2 * | 10/2005 | Tsuchiya | 374/100 |
| 2002/0088640 A1 | 7/2002 | Schuh et al. | 174/117 |
| 2004/0220775 A1 | 11/2004 | Schuh | 702/185 |
| 2004/0255998 A1 * | 12/2004 | Schuh | 136/224 |
| 2005/0129091 A1 * | 6/2005 | Habboosh | 374/208 |
| 2006/0227849 A1 | 10/2006 | Phillips | 374/179 |
| 2007/0200475 A1 * | 8/2007 | Schaffer | 313/300 |
| 2009/0107537 A1 * | 4/2009 | Conti | 136/236.1 |

* cited by examiner

*Primary Examiner*—Lisa M Caputo
*Assistant Examiner*—Mirellys Jagan
(74) *Attorney, Agent, or Firm*—Kevin M. Able

(57) ABSTRACT

Disclosed is a thermocouple circuit that exhibits reduced levels of thermocouple drift. The thermocouple is generally comprised of first and second thermoelectric elements formed of first and second thermoelectric materials, respectively. The first and second thermoelectric elements are coupled to an electrically conductive substrate through intermediate first and second tab elements, respectively. The first and second tab elements are preferably formed of the respective first and second thermoelectric materials, and coupled to the substrate in a spaced apart configuration such that the first and second tab elements, are not physically coupled one to the other. Also disclosed are systems and methods for the preparation and use of the thermocouple circuits disclosed herein.

18 Claims, 8 Drawing Sheets

THERMOCOUPLE CIRCUIT AND METHOD AND SYSTEM FOR FORMING SAME

BACKGROUND OF THE INVENTION

1. Field of the Invention

The present invention relates generally to thermocouples and, more particularly, to a system and method for forming a thermocouple circuit exhibiting reduced levels of thermocouple drift.

2. Technical Background

Conventional thermocouples are typically manufactured by physically coupling two thermoelectric elements of dissimilar composition to one another. The thermoelectric elements are typically wires of dissimilar metal, wherein ends of the wires are twisted together or otherwise joined. A temperature difference between the junction of the coupled wires and remote portions of the wires will develop a voltage between the opposite ends of the wires. A voltage measuring device (e.g. voltmeter) may then be coupled into the circuit to detect the voltage, and the voltage correlated with a temperature. Thermocouple performance and accuracy is dependent upon uniformity of both physical and chemical properties along the entire length of the circuit, and in particular the thermoelectric elements (e.g. wires). When thermoelectric element materials are produced, careful steps are taken to assure that this uniformity (or homogeneity) is achieved. However, in use, diffusion or migration of chemical species within the thermoelectric materials can result in a change in chemical composition of the thermoelectric elements, thus resulting in drift or inaccuracy of the thermocouple performance.

For example, an exemplary conventional type B thermocouple, such as that shown in FIG. 1, is comprised of a first wire 10 having a chemical composition that is an alloy of 94% platinum and 6% rhodium. A second wire 20, physically coupled to the first wire at the hot junction 30 is comprised of an alloy of 70% platinum and 30% rhodium. Hot junction 30 is shown coupled to an electrically conductive substrate 40 comprising 80% platinum and 20% rhodium. A voltage develops across the ends of the wires opposite the hot junction as a result of the familiar Seebeck effect, which voltage is primarily a result of the temperature gradient along the length of the wires. The voltage may be read with a conventional measuring device, such as a voltmeter, and the voltage correlated to a temperature of the substrate.

Analysis of data from such a conventional system indicates that this exemplified thermocouple design loses calibration while in operation at high temperature, such as a temperature of approximately 1650° C., with an average net rate of drift value of up to approximately −2.7° C. over 30 days due in large part to diffusion of rhodium between the wires and the substrate. That is, the rhodium concentration between the co-joined elements—the wires and the substrate—begins to equilibrate. To that end, it will be appreciated that when processes and systems are under temperature control, and a thermocouple design that is employed to facilitate the temperature control results in a drift in registered temperature, the perceived change in temperature due to the drift can result in an forced change in the actual temperature that is unwarranted, which can lead to a degradation in the operation of the process or system.

SUMMARY

The present invention provides a thermocouple circuit that is capable of exhibiting reduced levels of thermocouple drift over a period of use. The thermocouple can be used to measure temperatures in any electrically conductive materials such as, for example, the platinum delivery systems used in the manufacture of glass substrates. Among several advantages provided by various aspects of the present invention is improved accuracy of the thermocouple over time.

In one aspect, the present invention provides a method for determining a temperature of a portion of an electrically conductive substrate, comprising providing a thermocouple comprising a first thermoelectric element formed of a first thermoelectric material and having a first proximal end and a first distal end, and a second thermoelectric element formed of a second thermoelectric material and having a second proximal end and a second distal end, forming a thermocouple circuit by coupling the respective proximal ends of the first and second thermoelectric elements to a portion of the substrate through intermediate first and second tab elements, respectively, the first and second tab elements having a composition substantially the same as the first and second thermoelectric materials, respectively, and wherein the first and second tab elements are spaced apart such that the first and second proximal ends are not physically coupled each to the other, and quantifying a voltage provided by the formed thermocouple circuit, wherein said voltage is indicative of a temperature within the portion of the substrate The thermocouple circuit generally comprises a first thermoelectric element formed of a first thermoelectric material and having a first proximal end and a first distal end, wherein the first proximal end is coupled to an electrically conductive substrate through an intermediate first tab element formed of the first thermoelectric material at a first coupling position, a second thermoelectric element formed of a second thermoelectric material and having a second proximal end and a second distal end, wherein the second proximal end is coupled to the electrically conductive substrate through an intermediate second tab element formed of the second thermoelectric material at a second coupling position, and wherein the first and second coupling positions are spaced apart such that the first and second proximal ends are not physically coupled and the first and second distal ends are electrically coupled to a voltage measuring device.

Additional aspects of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a thermoelectric element includes aspects having two or more such thermoelectric elements unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a net voltage refers to a sum or a difference of two or more voltages, depending on the polarity of the two or more voltages.

Figure 2:
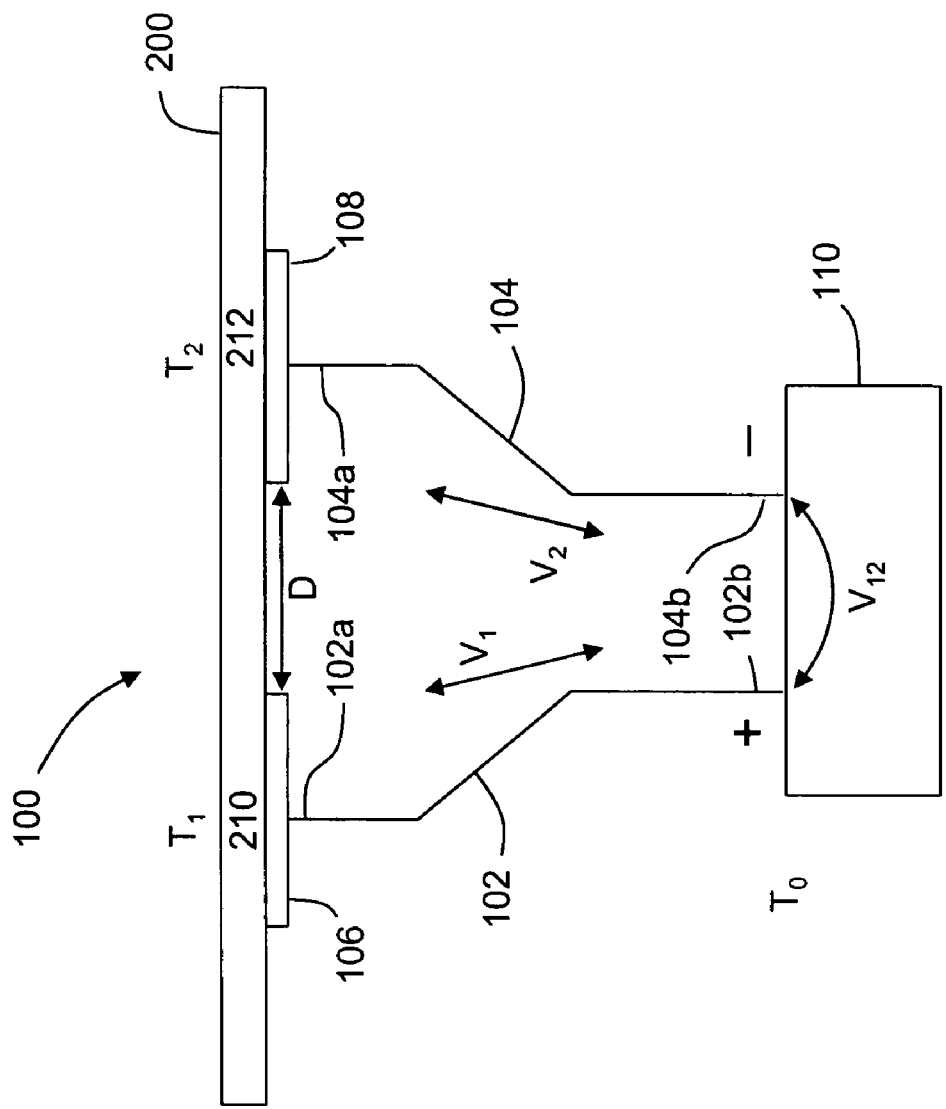
FIG. 2 illustrates an exemplary thermocouple circuit according to one aspect of the present invention.

As briefly summarized above, in one embodiment, the present invention provides a system 100 for forming a thermocouple circuit. With reference to FIG. 2, the system 100 generally comprises a first thermoelectric element 102 formed of a first thermoelectric material and having a first proximal end 102a and a first distal end 102b. The first proximal end 102a is configured to be coupled to a substrate 200 at a first coupling point 210. The system 100 further comprises a second thermoelectric element 104 formed of a second thermoelectric material and having a second proximal end 104a and a second distal end 104b. As shown, the second distal end 104b and the first distal end 102b can be coupled to measurement device 110 a distance from the substrate. Measurement device 110 can be, for example, a device for measuring a voltage between the first and second distal ends, and may include a data processing component. For example, measurement device 110 may include a computer.

The second proximal end 104a is configured to be coupled to the substrate 200 at a second coupling point 212 spaced a distance "D" apart from the first coupling point such that the second proximal end is not physically coupled to the first proximal end 102a.

As further shown, in one aspect the portion of system 100 extending between the proximal and distal ends of the thermoelectric elements can be provided as a thermoelectric lead or extension wires. Further, the first and second thermoelectric elements are each formed of different thermoelectric materials which, in combination, are suitable for forming a thermocouple circuit that can exhibit the Seebeck thermoelectric effect. To this end, in one aspect, the first and second thermoelectric elements may be formed of virtually any dissimilar metals, including noble metals and/or noble metal alloys.

Exemplary thermoelectric materials for forming the respective first and second thermoelectric elements can include platinum, rhodium, nickel, chromium, copper, nickel, iron, aluminum, silicon, magnesium, and alloys thereof. Exemplary combinations of the aforementioned thermoelectric materials can include 70% platinum-30% rhodium alloy and 94% platinum-6% rhodium (known as a type B thermocouple); nickel-chromium alloy and a copper nickel alloy (known as a type E thermocouple); iron and a copper nickel alloy (known as a type J thermocouple); nickel-chromium alloy and nickel-aluminum alloy (known as a type K thermocouple); nickel-chromium-silicon alloy and nickel-silicon-magnesium alloy (known as a type N thermocouple); 13% platinum-rhodium and platinum-platinum (known as a type R thermocouple); 10% rhodium and platinum (known as a type S thermocouple); and copper and a copper-nickel alloy (known as a type T thermocouple).

The first and second proximal ends of the thermoelectric elements can be coupled to an electrically conductive substrate to form a thermocouple circuit. In particular, the first proximal end 102a can be coupled to an electrically conductive substrate at a first coupling position 210 and the second proximal end 104a can be coupled to the electrically conductive substrate at a second coupling position 212. The first and second coupling positions are spaced a distance "D" apart such that the first and second proximal ends are not physically coupled to each other. The coupling of the first and second proximal ends with the electrically conductive substrate is referred to herein as the 'hot junction."

As further shown in FIG. 2, first proximal end 102a and second proximal end 104b can each be coupled to the substrate 200 by respective spaced apart first and second tab elements 106 and 108, that are positioned intermediate to the respective distal ends and the electrically conductive substrate. In one aspect, the respective first and second tab elements are formed from the same thermoelectric materials as the respective first and second thermoelectric elements. For example, in an aspect where the formed thermocouple circuit is a type B thermocouple, the first thermoelectric element may be comprised of a 70% platinum-30% rhodium alloy and the second thermoelectric element may be formed of a 94% platinum-6% rhodium alloy. According to this exemplary aspect, the first tab element 106 would also be formed of a 70% platinum-30% rhodium alloy and the second tab element would be formed from the 94% platinum-6% rhodium alloy.

It has been found that in addition to other advantages, spaced apart coupling points reduces or eliminates the condensation of volatized metallic species from one thermoelectric element of a first composition onto a second thermoelectric element of a second composition. Such volatilization can occur if the thermoelectric elements are exposed to very high temperatures, such as temperatures in excess of 1500° C. as might be found in a glass making process. The volatilized species, such as rhodium for example, can condense on cooler portions of the thermoelectric element(s), and be diffused into the thermoelectric element, thereby changing the electrical behavior of the thermoelectric element and thus the detected voltages in the thermocouple circuit (i.e. be observed as a thermocouple temperature drift).

Tab elements 106 and 108 function to mitigate the effects of diffusion between the thermoelectric elements and the substrate by providing a much larger mass immediately adjacent the substrate and interposed between the substrate and the thermoelectric elements so that changes in composition of these various elements resulting from diffusion is reduced. Tab elements 106 and 108 can have any desired shape and thickness suitable for electrically coupling the proximal end of the thermoelectric elements to the substrate surface. However, the mass of each of the tab elements 106, 108 is substantially greater than the mass of each respective thermoelectric element adjacent the substrate.

Figure 3:
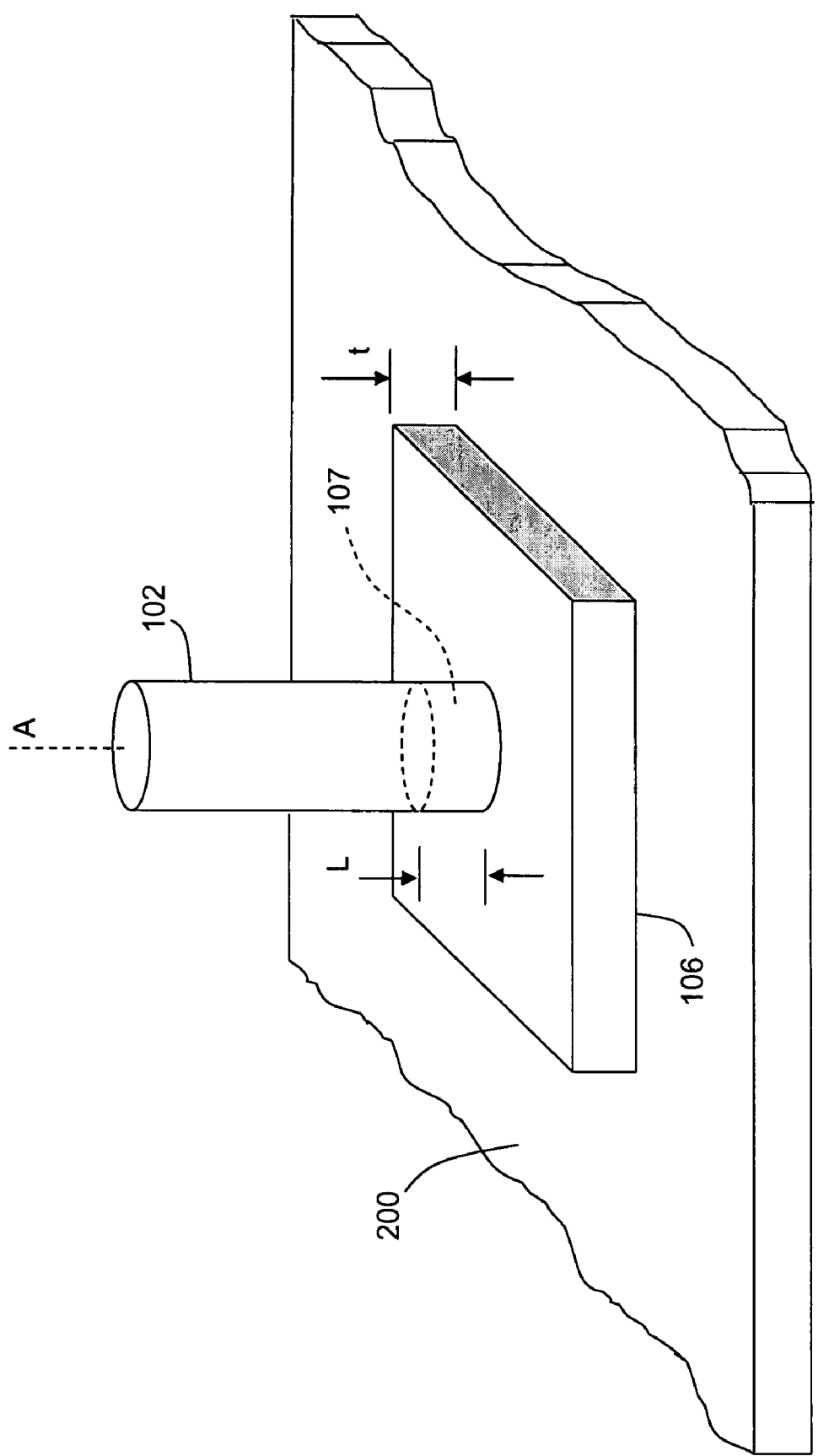
FIG. 3 is a perspective view illustrating a portion of the exemplary thermocouple circuit according to FIG. 2.

Each tab element can have a rectangular shape (as shown), circular shape, or an elliptical shape. In one aspect, the tab elements are substantially rectangular in shape having a surface area coupled to the electrically conductive substrate that is in the range of approximately 0.1 to 0.5 inches. For example, and without limitation, in one aspect the tab elements can have a coupling surface area of approximately 0.25 inches. The tab elements can also have a substantially uniform thickness that, in an exemplary aspect can be in the range of from about 10 mils to about 50 mils. For example, and without limitation, in one aspect the tab element can have a substantially uniform thickness of about 30 mils. In practical terms, each tab element has nominal length-width measurements (assuming a rectangular shape) or a diameter (assuming a circular shape) that is substantially larger than equivalent dimensions of the respective thermoelectric element. As an example, and as illustrated in FIG. 3, assume a thermoelectric element 102 that is a wire having a longitudinal axis A of the wire, and a tab element 106 intermediate between the wire and the substrate 200, and a volume of a portion of the wire adjacent the tab element and having a length equal to the thickness of the tab element preferably has a volume substantially less than the volume of the tab element. Preferably, the volume of the tab element is substantially larger than the volume of the respective portion of the wire adjacent to and coupled to the tab element. The wire may be viewed as a right circular cylinder attached to a tab element having a given thickness. The tab element has a certain volume $V_t$ based on the dimensions of the tab element, including the thickness of the tab element. A volume $V_w$ of a portion of the wire (i.e. right circular cylinder) having a length L equal to the thickness t of the tab element is substantially less than the volume of the tab element, or conversely, the tab element has a substantially greater volume than the volume of the portion of the wire having a length L adjacent the tab element. As shown by FIG. 3, the volume of tab element 106 is substantially greater than the volume of wire portion 107. By substantially larger what is meant is that the volume of the tab element is preferably at least about twice the volume of the adjacent portion of wire, more preferably at least about 4 times the volume of the adjacent portion of wire, and even more preferably at least about 8 times the volume of the adjacent portion of the wire. Of course, in typical circumstances the wire is nominally cylindrical and therefore has a circular cross section perpendicular to the longitudinal axis A. However, the thermoelectric element (e.g. wire) need not be circular to possess a portion having a volume as described above.

Figure 4:
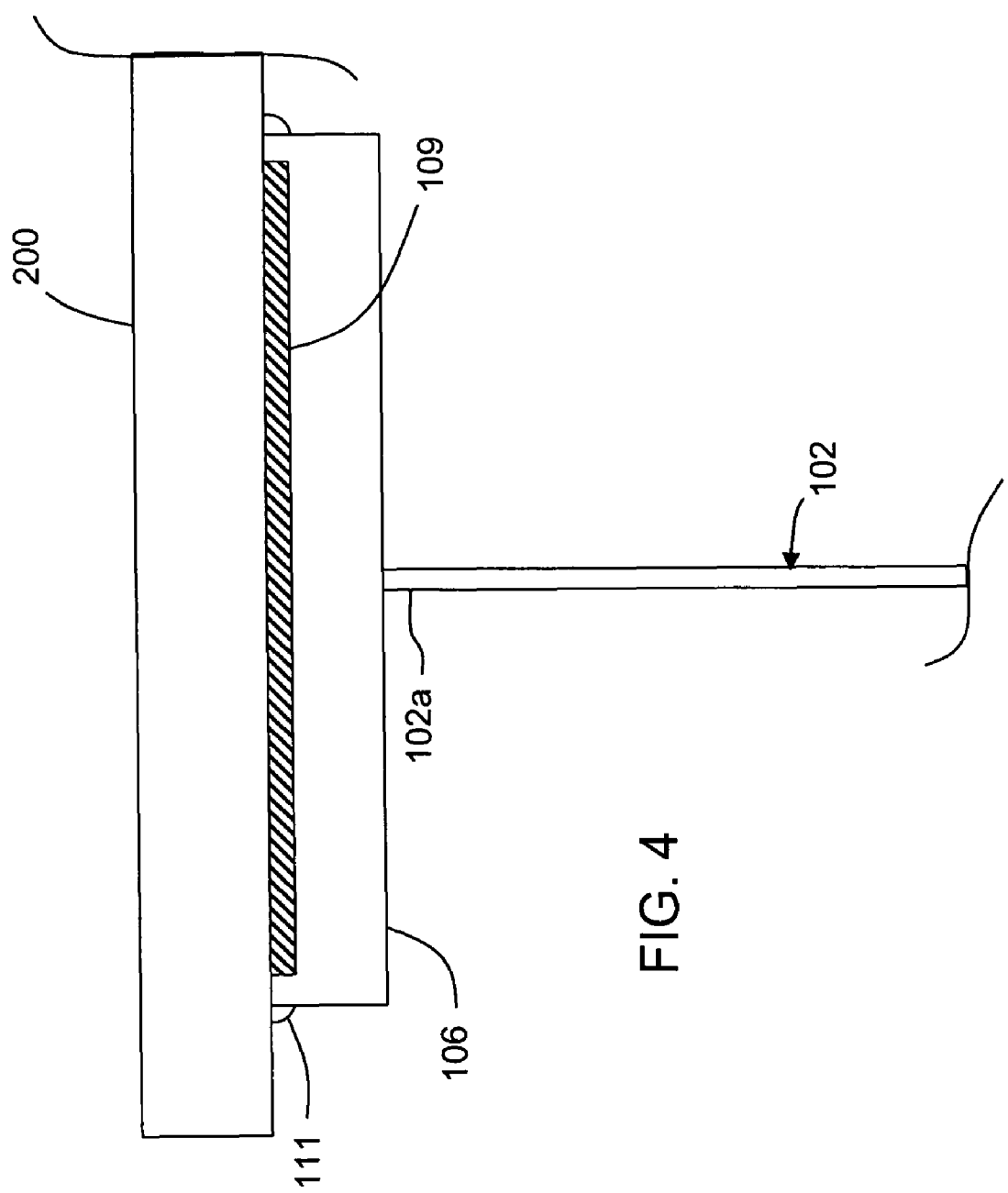
FIG. 4 schematically illustrates a portion of an exemplary thermocouple circuit and depicts an embodiment of a tab element having a minimal contact area with the substrate.

In still another aspect, illustrated in FIG. 4, it is desirable for the tab element(s) to be connected to the substrate 200 in a manner that minimizes the contact area between the substrate and the material of the tab element. According to this aspect, minimizing the contact area between the tab element and the substrate can effectively reduce the diffusion of chemical species between two thermoelectric materials (e.g. the diffusion of rhodium) and can thus further reduce thermocouple drift. To this end, an insulating member 109 that nevertheless has a high thermal conductivity may be placed between a tab element and substrate 200. Coupling between the tab element and substrate 200 may thereafter be made by welding the tab element to the substrate about a periphery of the tab element only as indicated by welding bead 111. Of course, other methods of coupling the tab element to the substrate may be employed. For example, the tab element may be coupled to the substrate at only discrete, spaced apart locations in each tab element, such as by welding only corners of the tab element to the substrate.

A thermocouple circuit formed according to the present invention can exhibit a reduction in thermocouple drift when compared to the typical thermoelectric drift observed by conventional thermocouple devices. In particular, conventional thermocouple devices and circuits lose calibration over time while in operation. The loss in calibration is partially a result of diffusion that occurs between the two dissimilar thermoelectric elements that were physically connected to each other at the "hot junction" of the thermocouple circuit. This loss in calibration is referred to herein as thermoelectric drift and contributes to increasing inaccuracy of a thermocouple device. As described above, the proximal ends of the thermoelectric elements of the present invention are coupled to a substrate at coupling points spaced a distance "D" apart such that the proximal ends of the thermoelectric elements of the present invention are not physically coupled to one another. Nevertheless, diffusion between the substrate and the individual thermoelectric elements may still lead to thermoelectric drift. Consider, for example, a platinum/rhodium alloy vessel such as might be used in a glass making process for holding/processing a molten glass. Such vessels may operate in excess of 1500° C. Conventionally, individual platinum-rhodium alloy thermocouple wires, each having a different rhodium content, have been welded directly to the vessel wall. At such high operating temperatures, diffusion of rhodium between the substrate and the thermocouple wires was relatively rapid, as diffusion of rhodium across the junction between the wires and the vessel wall worked to reach an equilibrium concentration. The result was a continuously decreasing temperature as measured by the measuring device.

Tab or pad elements 106 and 108 can reduce or even eliminates the diffusion that can occur between the two dissimilar thermoelectric materials and therefore reduce thermoelectric drift (e.g. voltage or temperature drift) that can occur over time to substantially no drift. For example, in one aspect, a thermocouple circuit according to embodiments of the present invention can exhibit a rate of drift less than approximately 2.5° C. over a 30 day period at a temperature equal to or greater than about 1500° C. Still further, the thermocouple circuit can exhibit a rate of drift that is less than about 2.0° C., 1.5° C., 1.0° C., or even less than about 0.5° C. over a 30 day period at a temperature equal to or greater than about 1500° C. Still further, it should also be understood that the distance of separation "D," between the first and second coupling positions, can be any desired distance so long as any two dissimilar thermoelectric materials are not physically coupled to one another at a coupling position of the substrate material.

It should also be understood that the "hot junction" formed by a thermocouple circuit of the present invention is formed by the coupling of the first and second thermoelectric elements with the electrically conductive substrate, preferably through tab elements 106,108, and not by the physical junction of the two dissimilar thermoelectric elements themselves. As such, the resulting thermocouple circuit is more sensitive to changes in temperatures within the substrate itself. Further, the reported temperature will also be more representative of the substrate temperature as the substrate is part of the actual hot junction of the circuit.

Figure 5:
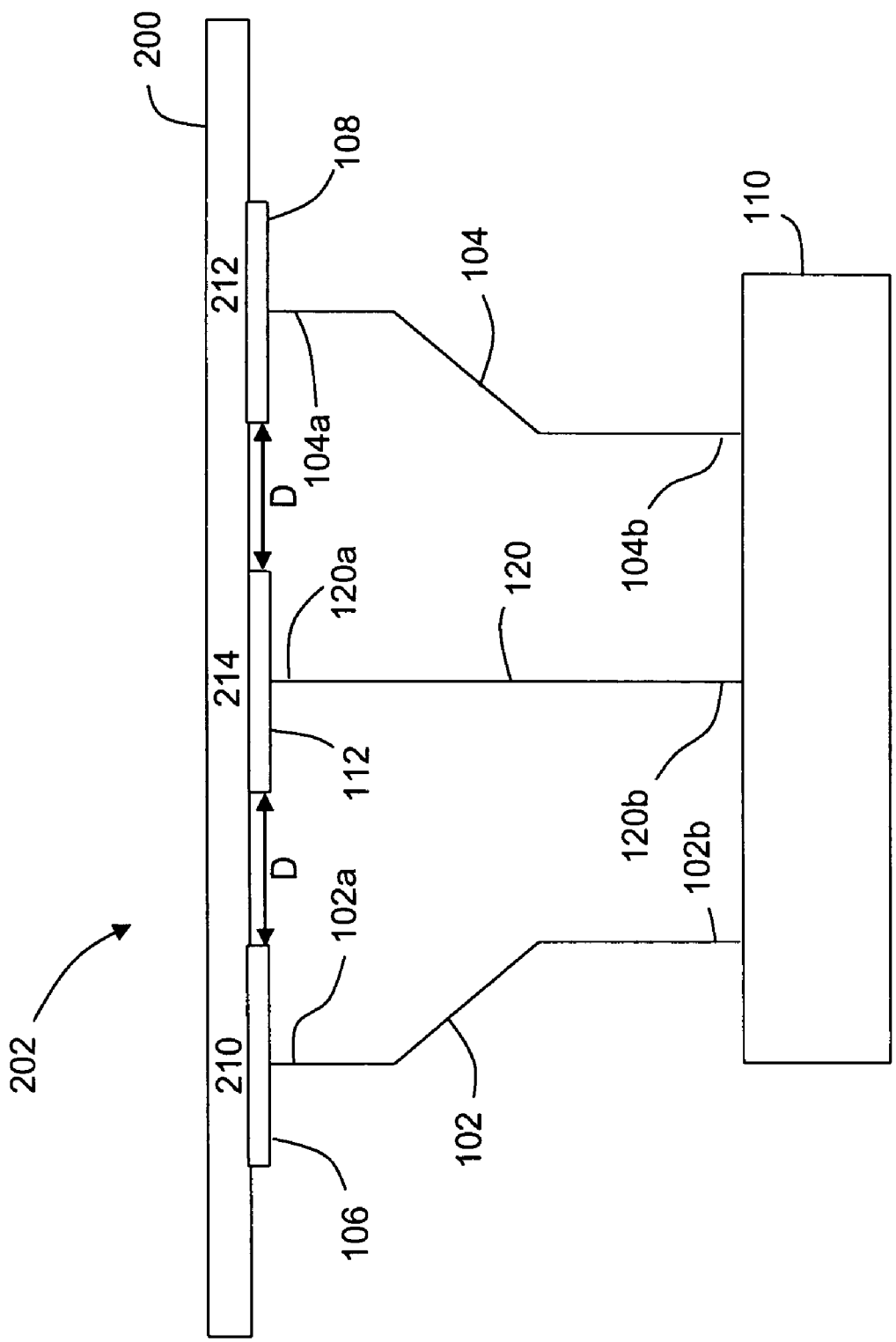
FIG. 5 is another thermocouple circuit according to an embodiment of the present invention.

It should also be understood that the separation of the thermoelectric elements results in the determination of an average temperature of the substrate between the two dissimilar thermoelectric elements coupled at the first and second coupling points 210 and 212. Therefore, in an alternative aspect, the thermocouple system of the present invention can be used to provide a plurality of thermocouple circuits capable of determining a three dimensional temperature model for a given substrate in real time. For example, as shown in FIG. 5, system 202 is similar to system 100, but comprises a third thermoelectric element 120 formed of a third thermoelectric material and having a third proximal end 120(*a*) and a third distal end 120*b*. The third distal end 120*b* can again be coupled to a suitable measuring device. The third proximal end can be coupled to the substrate at a third coupling point 214 spaced apart from the first and second coupling points such that the third proximal end is not coupled to either of the first and second proximal ends. Still further, the third thermoelectric element preferably also comprises a third tab element 112, coupled to the third proximal end. The third tab element 112 can again be formed from the same thermoelectric material as the third thermoelectric element and spaced apart a distance D from both the first and second tab elements so that the first, second and third tab elements are not physically coupled to each other.

In use, the thermocouple system and, hence thermocouple circuit, of the present invention provides a method for determining a temperature of a portion of an electrically conductive substrate. The method comprises forming a thermocouple circuit as described above. In particular, a proximal end of a first thermoelectric element, formed of a first thermoelectric material, is coupled to a conductive substrate at a first coupling position, preferably through a first tab element. A proximal end of a second thermoelectric element, formed of a second thermoelectric material, is coupled to the conductive substrate at a second coupling position, preferably through a second tab element spaced apart from the first coupling position such that the first and second thermoelectric elements, and their respective tab elements, are not physically coupled.

It should be understood that the method of the present invention is not limited for use with any particular substrate material and may be used to determine the temperature of any desired electrically conductive substrate. However, in an exemplary aspect, the substrate is an electrically conductive substrate, such as, for example, a platinum and/or rhodium based delivery system used in the preparation of glass (e.g. silica-based glass).

Once formed, the thermocouple circuit is then capable of providing a voltage within the formed circuit, resulting from the temperature gradient along the thermoelectric elements. The provided voltage can be quantified by a conventional measuring device in communication with the thermocouple circuit. Accordingly, the quantified voltage is indicative of an average temperature within the portion of the substrate between the first and second coupling positions.

Figure 1:
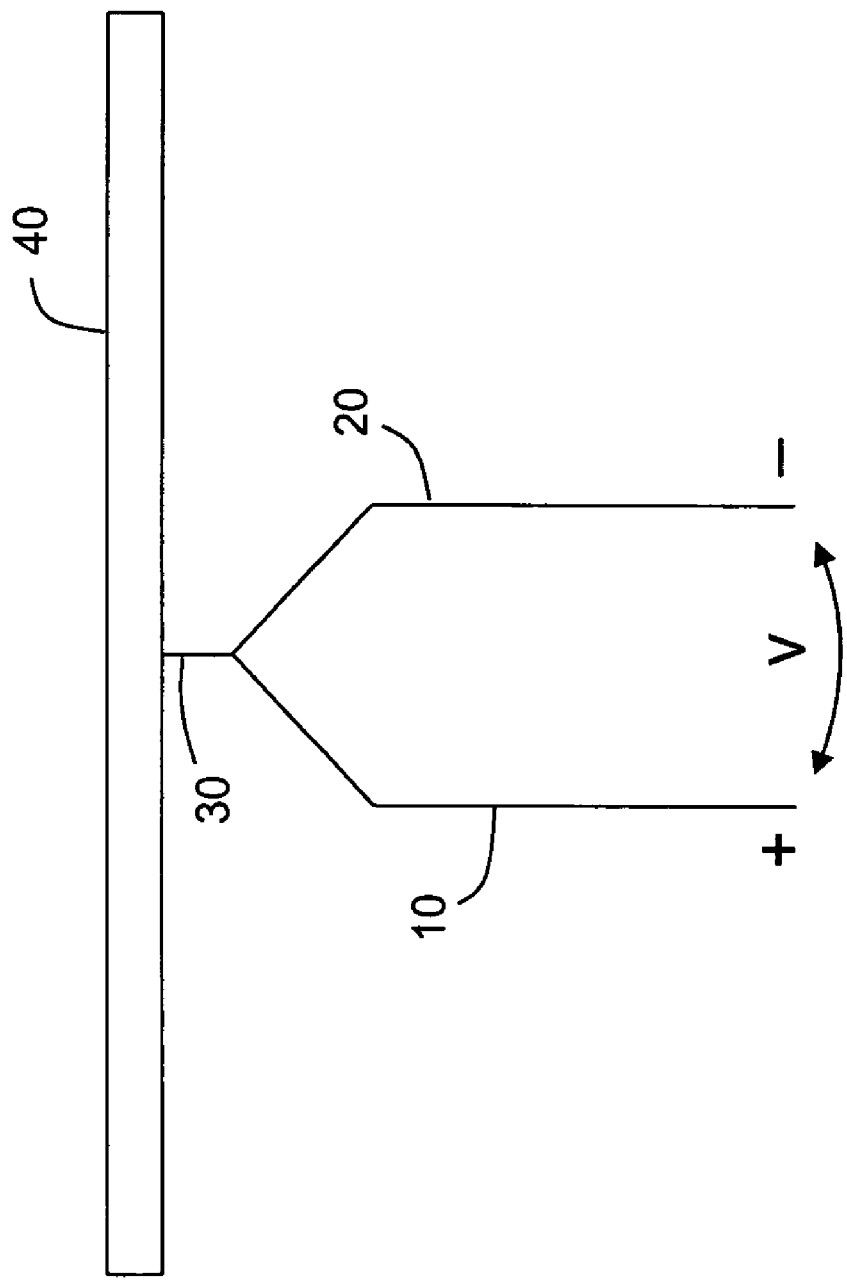
FIG. 1 illustrates a conventional thermocouple circuit.

An exemplary method of the present invention is illustrated with the aid of FIG. 1. As shown, a thermocouple circuit 100 is formed by first thermoelectric element 102, second thermoelectric element 104, and conductive substrate 200. The proximal ends of the first and second distal ends are coupled to the substrate at coupling positions 210 and 212. Further, the proximal ends 102*a* and 104*a*, as shown, are coupled to the substrate by respective thermoelectric tab or pad elements 106 and 108. The distal ends of the thermoelectric elements are also coupled to measuring device 110 a distance removed from the substrate. In use, the temperature gradient along the thermoelectric elements results in a voltage along thermoelectric element 102, and a similar voltage $V_2$ along thermoelectric element 104.

A conventional voltage detection system 110 can be used to detect and quantify the net voltage $V_{12}$ established in the thermocouple circuit between distal ends 102*b*, 104*b*. To this end, the detection system can detect the voltages $V_1$ and $V_2$, determine the net voltage, and correlate the net voltage to an estimated temperature of the conductive substrate 200. Since the two dissimilar tab elements are separated a distance "D," the estimated temperature represents an average temperature of the substrate between the coupling positions 210 and 212. An exemplary detection system can generally comprise computer monitoring system equipped with a standard I/O card for thermocouples. The detection system can read the DC voltage between the two legs or leads of the thermocouple. Using standard ASTM test methods known to one of ordinary skill in the art, the computer can then convert the signal to a temperature output.

Lastly, it should be understood that while the present invention has been described in detail with respect to certain illustrative and specific aspects thereof, it should not be considered limited to such, as numerous modifications are possible without departing from the broad spirit and scope of the present invention as defined in the appended claims.

EXAMPLES

To further illustrate the principles of the present invention, the following examples are put forth so as to provide those of ordinary skill in the art with a complete disclosure and description of how the systems, circuits, and methods claimed herein can be made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric.

In one experiment, the existence of thermocouple drift in an exemplary conventional type B thermocouple, similar to that shown in FIG. 1, was verified by monitoring rhodium diffusion in a conventional type B thermocouple. The data from this evaluation is set forth in FIG. 6.

The thermocouple was prepared in the conventional manner in which the 30% rhodium leg (curve 300) of the thermocouple was directly connected to the 6% rhodium leg (curve 302) by melting the two metals together in the form of a bead at the end of the wires with a welding unit. The thermocouple was then put in service for several months in a furnace that had ranged in temperature from 1350° C. to 1650° C. When the furnace was shut down, the thermocouple was removed and cross sectioned longitudinally along each leg of the thermocouple, starting at the weld bead, or hot junction between the two materials. A microprobe was then used to analyze the rhodium content of each leg of the thermocouple, starting at the hot junction of each leg and the substrate. This hot junction point is indicated as zero on the X axis of FIG. 6.

Figure 6:
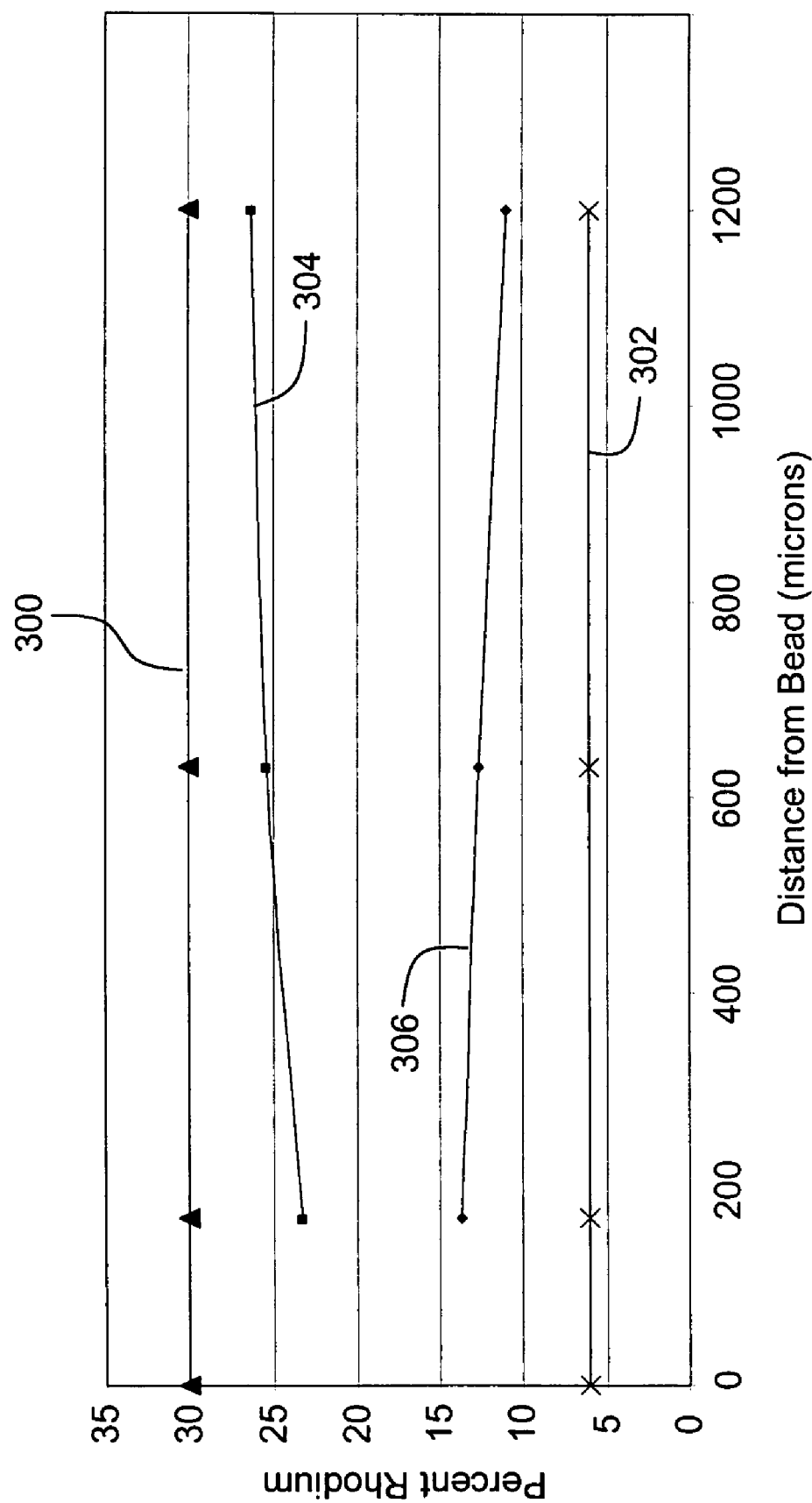
FIG. 6 is a graph of data indicating rhodium content of a conventional Type B thermoelectric element as a function of distance from the junction between the thermocouple and the substrate after use.

The data reported in FIG. 6 indicates that over several months of service, rhodium was diffusing from the 30% rhodium leg of the thermocouple into the 6% rhodium leg. This is shown by the less than 30% rhodium level in the high rhodium leg (curve 304) of the thermocouple and a greater than 6% rhodium level in the low Rh leg (curve 306) of the thermocouple. Without being bound to any particular theory, it is believed that the change in Rh content is the result of diffusion between the two thermoelectric materials. This diffusion is further believed to result in the electromotive force that is measured by the thermocouples being less than would otherwise be indicated by standard type B thermocouple tables.

Figure 7:
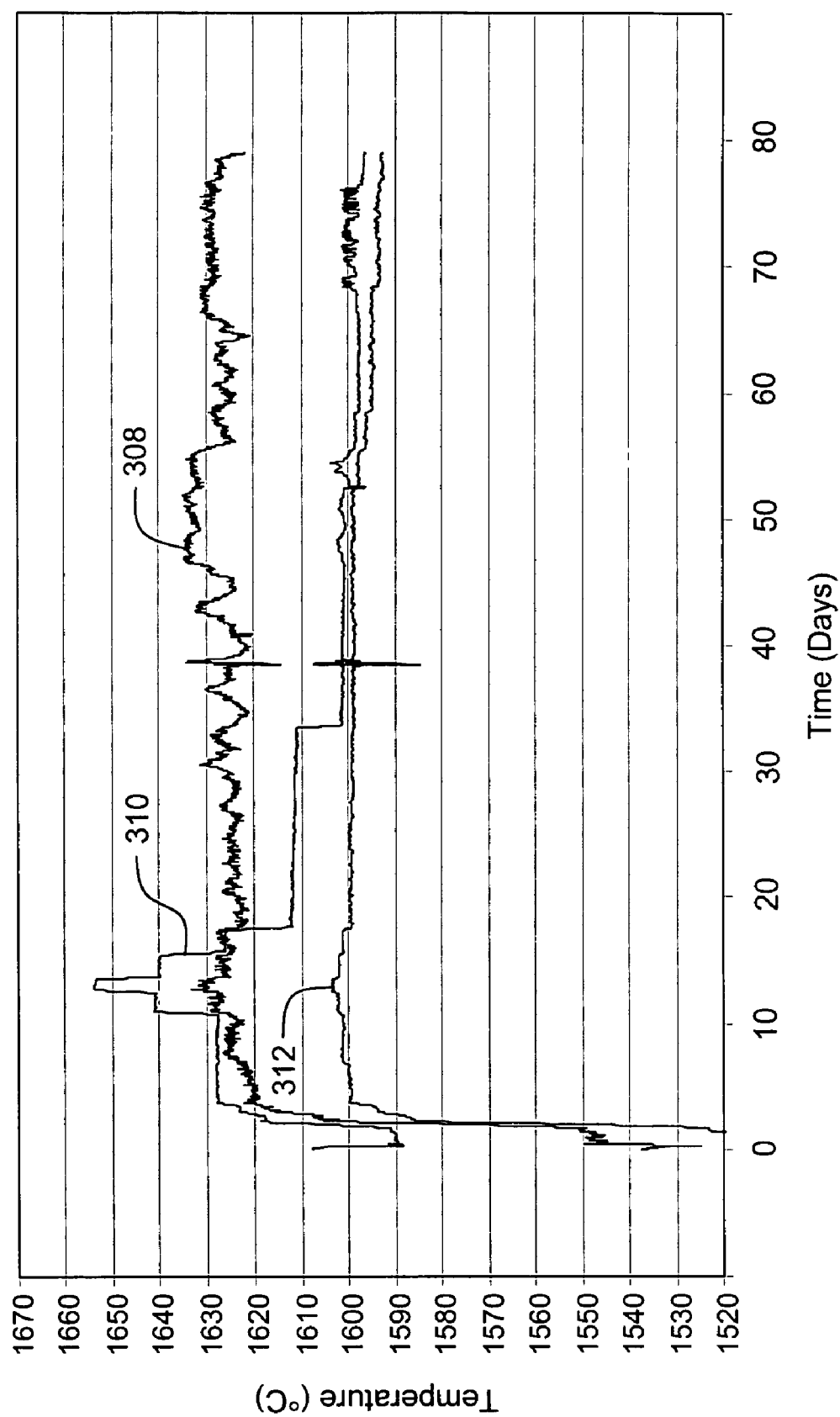
FIG. 7 is a graph of data indicating the reduced drift provided by a thermocouple circuit of the present invention compared to the drift displayed by two conventional thermocouples.

In another experiment, a type B thermocouple circuit according to the present invention and configured according to the schematic representation of FIG. 2 was formed and evaluated to determine the existence of any thermocouple drift over a period of approximately 80 days. The inventive thermocouple was further compared to two conventional type B thermocouples prepared according to the schematic representation of FIG. 1. The data resulting from the 80 day evaluation period is set forth in FIG. 7. As shown, the inventive thermocouple (curve 308) did not report any significant drift over the evaluation period. In contrast however, the two neighboring conventional thermocouples (curves 310, 312) did report drift.

Figure 8:
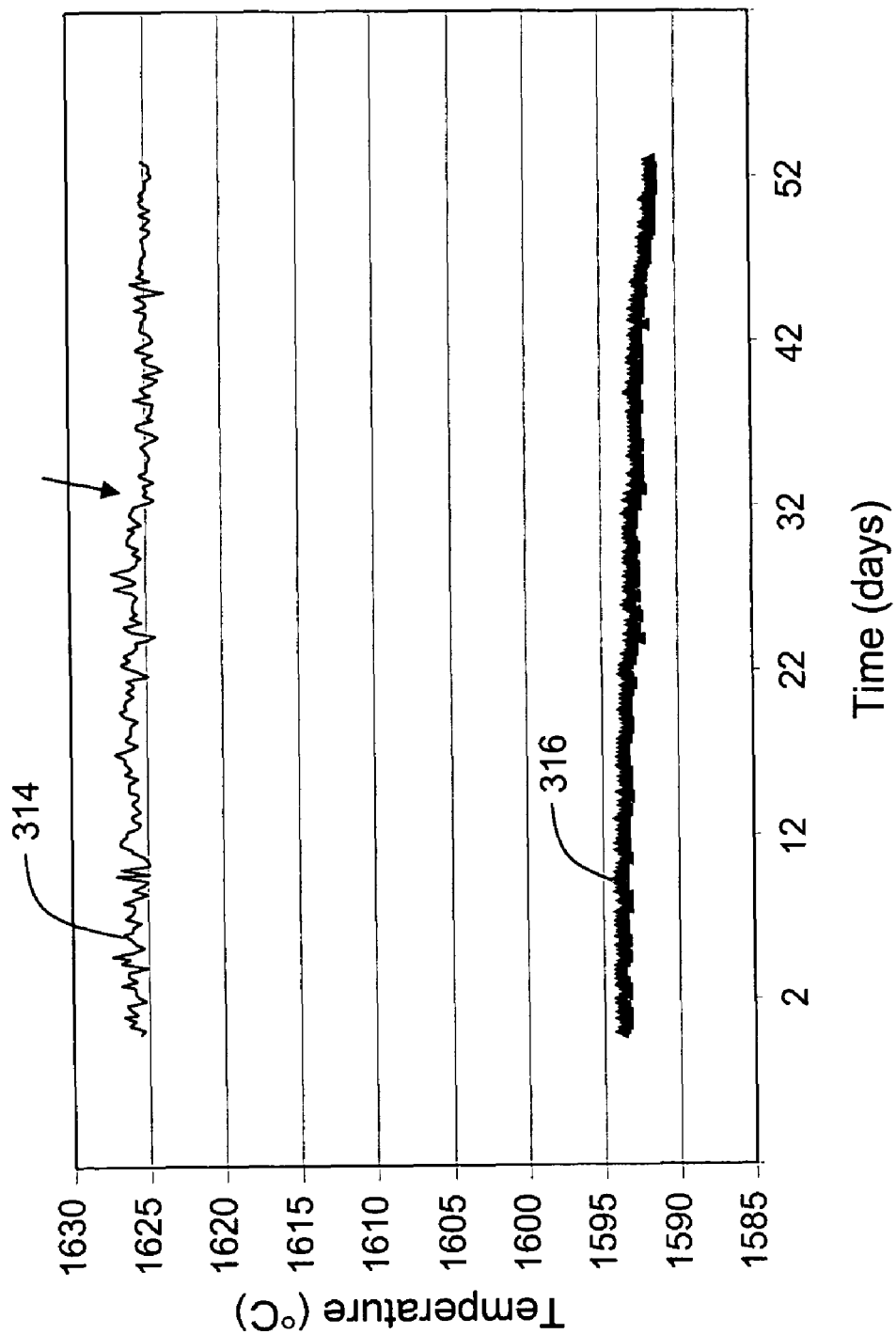
FIG. 8 is a graph illustration of exemplary data indicating reduced drift and improved sensitivity provided by a thermocouple circuit of the present invention compared to a conventional thermocouple circuit.

In still another experiment, a type B thermocouple circuit according to an embodiment of the present invention and configured according to the schematic representation of FIG. 2 was formed and evaluated to determine the existence of any thermocouple drift over a period of approximately 52 days. The inventive thermocouple was further compared to a conventional type B thermocouple prepared according to the schematic representation of FIG. 1. The data resulting from the 52 day evaluation period is set forth in FIG. 8. As shown, the inventive thermocouple (curve 314) did not report any significant drift over the evaluation period as evidence by the flat data line corresponding to the inventive thermocouple. In contrast however, the neighboring conventional thermocouple (curve 316) did report drift over the 52 day period, as evidenced by the downward slope in the data line corresponding to the conventional thermocouple.

Still further, at approximately day 32 of the evaluation period, the substrate temperature to which the thermocouples were connected was intentionally reduced by approximately 1° C. This controlled reduction in temperature was detected by the inventive thermocouple, as evidenced by the step change in the reported data and as indicated by the arrow in FIG. 8. In contrast, the conventional thermocouple did not report a step change corresponding to the controlled reduction in temperature at approximately day 32 of the evaluation period. Thus, it is shown that in one aspect, a thermocouple according to the present invention can also exhibit an improved sensitivity relative to the sensitivity of a conventional thermocouple design.

What is claimed is:

1. A method for determining a temperature of a portion of an electrically conductive substrate, comprising:
providing a thermocouple comprising a first thermoelectric element formed of a first thermoelectric material and having a first proximal end and a first distal end, and a second thermoelectric element formed of a second thermoelectric material and having a second proximal end and a second distal end;
forming a thermocouple circuit by coupling the respective proximal ends of the first and second thermoelectric elements to a portion of the electrically conductive substrate through intermediate first and second tab elements, respectively, the first and second tab elements having a composition substantially the same as the first and second thermoelectric materials, respectively, and wherein an insulating material is disposed between each of the first and second tab elements and the portion of the electrically conductive substrate;
reducing diffusion of chemical species between the electrically conductive substrate and each of the first and second tab elements by coupling the portion of the electrically conductive substrate to the first and second tab elements only at a periphery of the first and second tab elements, and wherein the first and second tab elements are spaced apart such that the first and second proximal ends are not physically coupled each to the other; and
quantifying a voltage provided by the formed thermocouple circuit, wherein said voltage is indicative of a temperature within the portion of the electrically conductive substrate.

2. The method according to claim 1, wherein the first and second thermoelectric materials are selected from the noble metals or noble metal alloys.

3. The method according to claim 1, wherein the electrically conductive substrate comprises platinum.

4. The method according to claim 1, wherein the thermocouple is a Type B thermocouple.

5. The method according to claim 1, wherein the quantified voltage is indicative of an average temperature within the portion of the electrically conductive substrate between the first and second proximal ends.

6. The method according to claim 1, wherein the electrically conductive substrate, the first and second thermoelectric elements and the first and second tab elements comprise a platinum-rhodium alloy.

7. The method according to claim 1, wherein the first tab element comprises a thickness $t_1$ and a volume $V_{t1}$, and wherein the first thermoelectric element is a first wire having a longitudinal axis, and wherein $V_{t1}$ is substantially greater than a volume $V_w$ of a portion of the first wire having a length L equal to $t_1$ and disposed adjacent to the first tab element.

8. The method according to claim 1, wherein the reducing diffusion comprises coupling the electrically conductive substrate to each of the first and second tab elements at discrete, spaced apart locations on the periphery of the first and second tab elements.

9. A thermocouple circuit, comprising:
a first thermoelectric element formed of a first thermoelectric material and having a first proximal end and a first distal end, wherein the first proximal end is coupled to an electrically conductive substrate through an intermediate first tab element formed of the first thermoelectric material at a first coupling position, wherein the first tab element is coupled to the electrically conductive substrate only at a periphery of the first tab element and an insulating material is disposed between the first tab element and the electrically conductive substrate, thereby minimizing contact between the electrically conductive substrate and the first tab element;
a second thermoelectric element formed of a second thermoelectric material and having a second proximal end and a second distal end, wherein the second proximal end is coupled to the electrically conductive substrate through an intermediate second tab element formed of the second thermoelectric material at a second coupling position, wherein the second tab element is coupled to the electrically conductive substrate only at a periphery of the second tab element and an insulating material is disposed between the second tab element and the electrically conductive substrate, thereby minimizing contact between the electrically conductive substrate and the second tab element; and wherein the first and second coupling positions are spaced apart such that the first and second proximal ends are not physically coupled and the first and second distal ends are electrically coupled to a voltage measuring device.

10. The thermocouple circuit according to claim 9, wherein the first and second thermoelectric materials are selected from the noble metals or noble metal alloys.

11. The thermocouple circuit according to claim 9, wherein the electrically conductive substrate comprises platinum.

12. The thermocouple circuit according to claim 9, wherein the formed circuit is a Type B thermocouple circuit.

13. The thermocouple circuit according to claim 9, wherein the circuit exhibits a rate of thermocouple temperature drift less than approximately 2.5° C. over a 30 day period at a temperature equal to or greater, than about 1500° C.

14. The thermocouple circuit according to claim 9, wherein the circuit exhibits substantially no thermocouple temperature drift over a 30 day period at a temperature equal to or greater than about 1500° C.

15. The thermoelectric circuit according to claim 9, wherein the electrically conductive substrate is coupled to each of the first and second tab elements at discrete, spaced apart locations on the periphery of the first and second tab elements.

16. The thermoelectric circuit according to claim 9, wherein the first tab element comprises a thickness $t_1$ and a volume $V_{t1}$, and wherein the first thermoelectric element is a first wire having a longitudinal axis, and wherein $V_{t1}$ is substantially greater than a volume $V_w$ of a portion of the first wire having a length L equal to $t_1$ and disposed adjacent to the first tab element.

17. The thermoelectric circuit according to claim 16, wherein $V_{t1}$ is at least twice as great as $V_w$.

18. The thermoelectric circuit according to claim 16, wherein $V_{t1}$ is at least four times as great as $V_w$.

* * * * *